(12) United States Patent
Farber et al.

(10) Patent No.: US 11,885,710 B2
(45) Date of Patent: Jan. 30, 2024

(54) OIL NOZZLE HEALTH DETECTION USING LIQUID FLOW TEST

(71) Applicant: PRATT & WHITNEY CANADA CORP., Longueuil (CA)

(72) Inventors: Steven Farber, Montreal (CA); Patrick E Paradis, Eastman (CA); Lukasz Jost, Rzeszow (PL); Piotr Grabski, Rzeszow (PL); Marcin Siedlarz, Krasne (PL); Piotr Mazur, Rzeszow (PL); Rafał Panek, Żołnia (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/805,876

(22) Filed: Jun. 8, 2022

(65) Prior Publication Data

US 2023/0400387 A1    Dec. 14, 2023

(51) Int. Cl.
*G01M 15/14*    (2006.01)
(52) U.S. Cl.
CPC .................................. *G01M 15/14* (2013.01)
(58) Field of Classification Search
CPC ..................................................... G01M 15/14
See application file for complete search history.

(56) References Cited

U.S. PATENT DOCUMENTS

| | | | |
|---|---|---|---|
| 4,452,037 A | | 6/1984 | Waddington et al. |
| 5,193,406 A | * | 3/1993 | Wolf ....................... B05B 15/18 |
| | | | 73/865.9 |
| 6,000,283 A | | 12/1999 | Wyatt |
| 7,966,804 B2 | | 6/2011 | Snow |
| 8,596,417 B2 | | 12/2013 | Barrett et al. |
| 9,463,402 B2 | | 10/2016 | Colotte et al. |
| 9,889,995 B1 | * | 2/2018 | Nishri .................... B65G 51/03 |
| 11,047,306 B1 | | 6/2021 | Millhaem et al. |
| 11,149,642 B2 | | 10/2021 | Bayraktar et al. |
| 2020/0340439 A1 | * | 10/2020 | Jacobs ................... F02M 65/00 |

* cited by examiner

*Primary Examiner* — Eric S. McCall
(74) *Attorney, Agent, or Firm* — NORTON ROSE FULBRIGHT CANADA LLP (57) ABSTRACT

A flow measuring system for one or more oil nozzles of a lubrication system of an aircraft engine comprises an external supply of a testing liquid and a pump fluidly connecting the external supply of the testing liquid to an inlet of the lubrication system via a first conduit. The inlet to the lubrication system is disposed upstream of the one or more oil nozzles. A second conduit fluidly connects an outlet of the lubrication system to the external supply of the testing liquid. The outlet of the lubrication system is disposed downstream of the one or more oil nozzles. A flow measuring device is operable to measure a flow resistance through the one or more oil nozzles.

19 Claims, 8 Drawing Sheets

OIL NOZZLE HEALTH DETECTION USING LIQUID FLOW TEST

TECHNICAL FIELD

The present disclosure relates generally to aircraft engines and, more particularly, to lubricant systems used in such engines.

BACKGROUND

For some aircraft engines, such as gas turbine engines, some parts may remain hot after the engine is shut down. For instance, a turbine disk of a low-pressure or power turbine, which may be a heavy component having an important thermal mass, may retain its heat after shut down. This heat may radiate to neighboring components. It was observed that, in some instances, the heat from the turbine disk radiates toward oil nozzles of a lubricant system. In turn, this heat may cause the oil to coke, thereby blocking one or more oil nozzles. Thus, the blocked oil nozzles may not be able to supply oil to lubricate nearby component, which may therefore see an impairment in their performance.

SUMMARY

In one aspect, there is provided a flow measuring system for one or more oil nozzles of a lubrication system of an aircraft engine, comprising: an external supply of a testing liquid; a pump fluidly connecting the external supply of the testing liquid to an inlet of the lubrication system via a first conduit, the inlet to the lubrication system disposed upstream of the one or more oil nozzles; a second conduit fluidly connecting an outlet of the lubrication system to the external supply of the testing liquid, the outlet of the lubrication system disposed downstream of the one or more oil nozzles; and a flow measuring device operable to measure a flow resistance through the one or more oil nozzles.

In another aspect, there is provided a system for detecting obstructions in one or more oil nozzles of a lubrication system of an aircraft engine, comprising: a flow measuring unit having an external supply of a testing liquid, a pump fluidly coupled to an outlet of the flow measuring unit, a flow measuring device operable to measure a flow resistance through the one or more oil nozzles, and an inlet of the flow measuring unit; and a calibration circuit having one or more calibration nozzles corresponding to the one or more oil nozzles of the lubrication system, an inlet of the calibration circuit fluidly connectable to the outlet of the flow measuring device and disposed upstream of the one or more calibration nozzles, and an outlet of the calibration circuit fluidly connectable to the inlet of the flow measuring device and disposed downstream of the one or more calibration nozzles; wherein the flow measuring unit is operable to circulate the testing liquid through the calibration circuit to measure a baseline flow measurement for the one or more calibration nozzles and to circulate the testing liquid through the one or more oil nozzles of the lubrication system to compare a flow measurement through the one or more oil nozzles to the baseline flow measurement.

In another aspect, there is provided a method for detecting obstructions in an oil nozzle of an aircraft engine, comprising: determining a baseline flow measurement for the oil nozzle by flowing a testing liquid through an unblocked nozzle corresponding to the oil nozzle and measuring a flow resistance through the unblocked nozzle; flowing the testing liquid through the oil nozzle; measuring a flow resistance of the testing liquid through the oil nozzle; and comparing the flow resistance of the testing liquid through the oil nozzle with the flow resistance of the testing liquid through the unblocked nozzle.

BRIEF DESCRIPTION OF THE DRAWINGS

Reference is now made to the accompanying figures in which.

DETAILED DESCRIPTION

Figure 1:
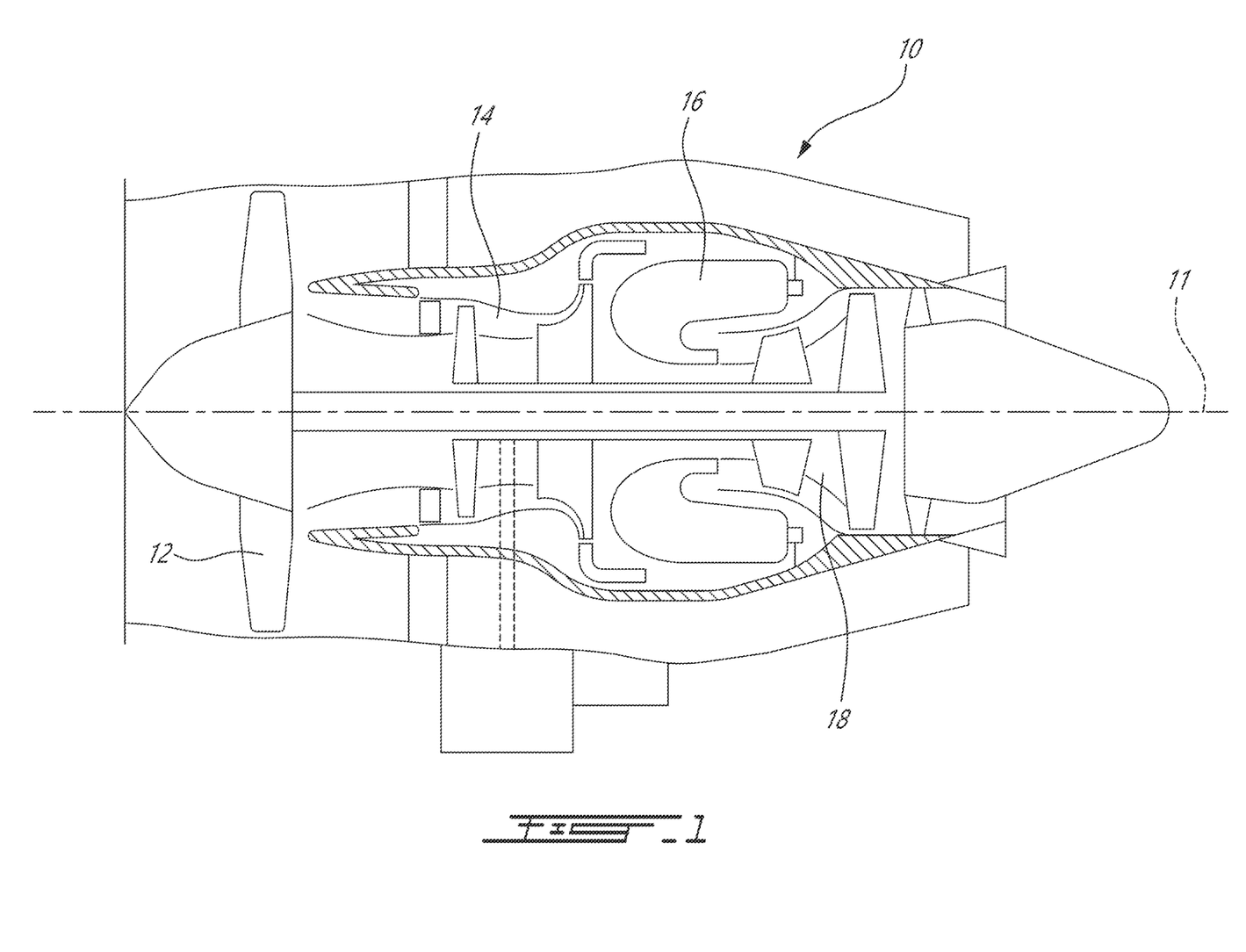
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, the combustor 16 and the turbine section 18 are coaxially mounted along an engine centerline 11. While FIG. 1 depicts gas turbine engine 10 to be a turbofan-type engine, the present disclosure is applicable to other types of aircraft engines, for instance turboprop or turbojet-type engines, as well as hybrid or compounded engines.

Figure 2:
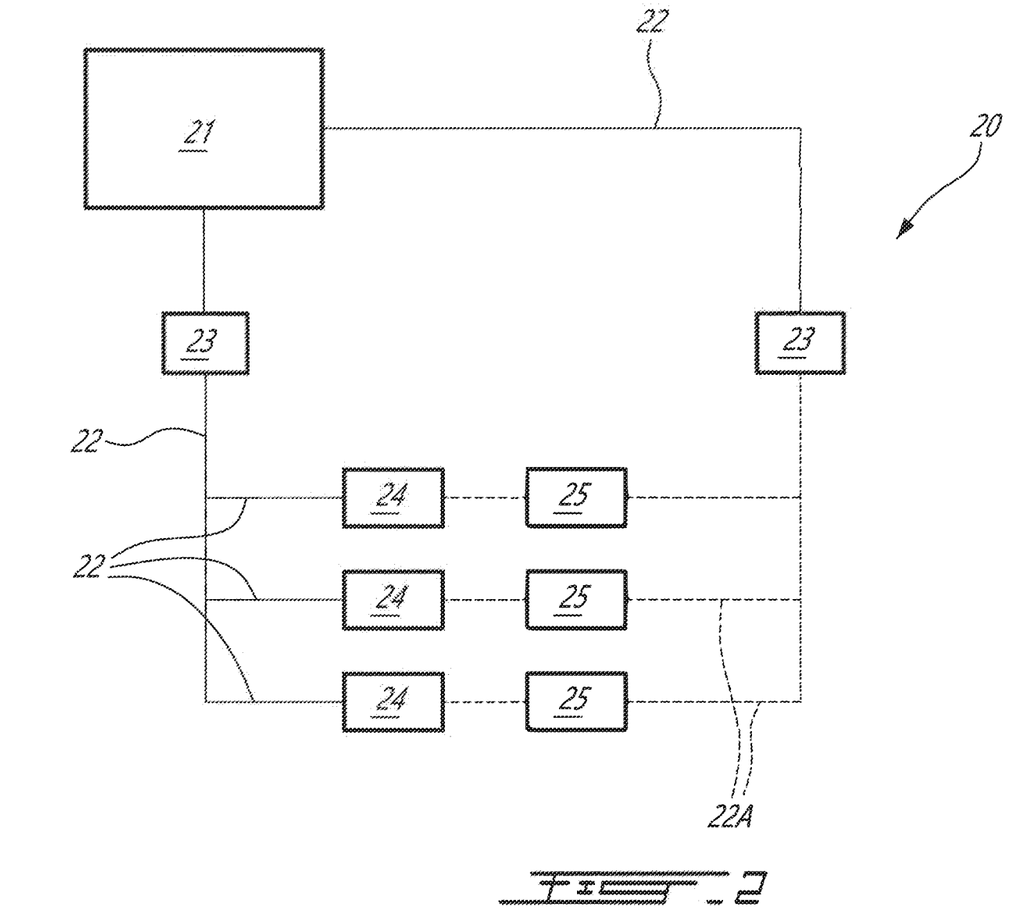
FIG. 2 is a block diagram of an exemplary lubrication system for a gas turbine engine.

Referring to FIG. 2, engine 10 includes a lubrication system 20 operable to circulating a lubricant, such as oil, through various components to provide lubrication and/or cooling. The lubricant may be stored in an onboard container 21 and may be circulated throughout the engine 10 via various conduits 22, pumps 23 and nozzles 24 which may direct the lubricant towards various components 25 requiring lubrication and/or cooling, and then return the lubricant to the container 21. The lubricant may follow various additional defined or undefined pathways 22A between the nozzles 24, components 25 and pumps 23. It is understood that FIG. 2 is a simplified depiction of a lubrication system for engine 10, and various additional components such as filters, heat exchangers, etc. are omitted for clarity.

Figure 3:
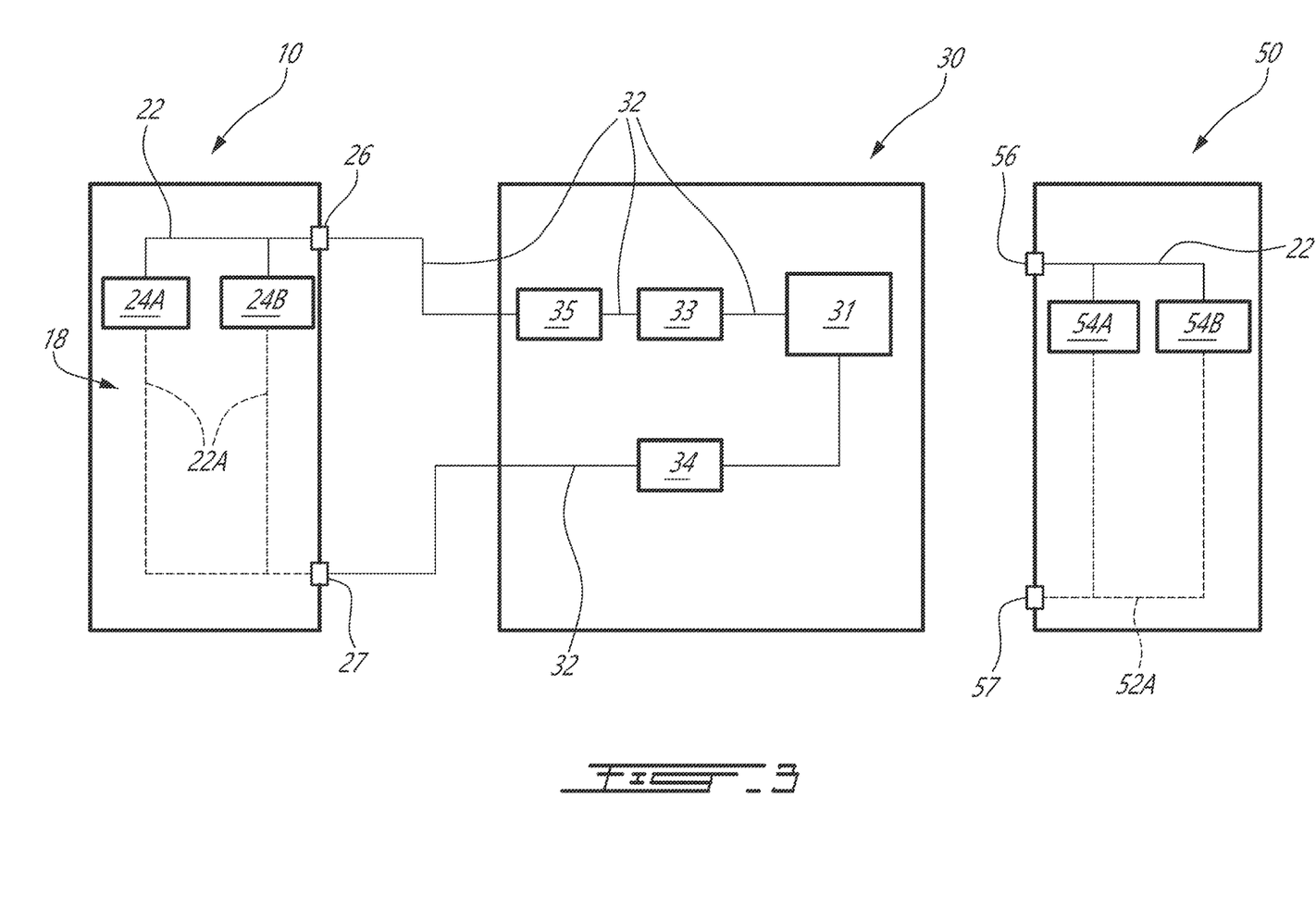
FIG. 3 is a block diagram of a flow measuring system for a gas turbine engine.

In a specific embodiment of a lubrication system 20, and as shown in FIG. 3, oil may be directed via one or more oil nozzles 24 (two oil nozzles 24A, 24B are shown) that operable to lubricate one or more components 24 (two components 24A, 24B) in the turbine section 18 of the engine 10. Upon shutdown of the engine, residual heat from the turbine section 18 may radiate towards the oil nozzles 24, which may cause any remaining oil in the oil nozzles 24 to coke or otherwise harden. One or more oil nozzles 24 may thus become at least partially blocked, which may negatively impact the operability of the lubrication system. It is understood this embodiment (i.e., the location of the oil nozzles) is exemplary, and the present disclosure is applicable to oil nozzles 24 in other locations throughout engine 10 where they may be susceptible to partial or full blockage to due, for instance, residual radiating heat from a nearby component.

As shown in FIG. 3, a flow measuring system 30, also referred to as a flow measuring unit, is provided externally from and adjacent the engine 10 for testing or monitoring the flow resistance through one or more oil nozzles 24 in the engine 10, for instance in the turbine section 18 of the engine 10, and for detecting obstructions in the one or more oil nozzles 24. Oil nozzles 24 may become blocked or obstructed for a variety of reasons, for instance due to residual oil in the nozzles 24 coking due to residual heat in nearby components, such as in the turbine section 18 of engine 10. The flow measuring system 30 includes an external supply 31 of a testing liquid for circulating through the lubrication system 20, and various conduits or tubing 32 for fluidly connecting the flow measuring system 30 to the lubrication system 20 (i.e., to the engine 10). By external supply 31, it is understood that the testing liquid is distinct from the lubricant used in lubrication system 20. In some cases, the testing liquid is selected to match the lubricant used in the lubrication system 20, for instance a specific type of oil. Other testing liquids may be contemplated. As will be discussed in further detail below, this externally-contained testing liquid, distinct from the engine's lubricant, is circulated through the lubrication system 20 to detect any partial or full blockages or obstructions in one or more nozzles 24.

Flow measuring system 30 includes a first pump 33 fluidly connecting the external supply 31 of the testing liquid to an inlet 26 of the lubrication system 20, the inlet 26 disposed upstream of the oil nozzle(s) 24 to be tested. Various inlets 26 may be contemplated, as will be discussed in further detail below. The system 30 may further include a second pump 34 (also referred to as an additional pump) fluidly connected to an outlet 27 of the lubrication system 20, the outlet 27 disposed downstream of the oil nozzle(s) 24 to be tested. In other cases, the second pump 34 may be omitted, with testing liquid draining via gravity from the outlet 27 of the lubrication system 20 back to the external supply 31, as will be discussed in further detail below. Various outlets 27 may be contemplated, as will be discussed in further detail below. Flow measuring system 30 further includes one or more flow measuring device 35, illustratively disposed between the first pump 33 and the inlet 26 (other positions may be contemplated), and operable to measure a flow resistance through the nozzle(s) 24. Various types of flow measuring devices 35 may be contemplated, as will be discussed in further detail below.

FIG. 3 therefore shows a closed-loop testing circuit between the flow measuring system 30 and the lubrication system 20 where testing fluid is circulated from the external supply 31 via various conduits 32 and first pump 33 to the inlet 26 of the lubrication system 20. The testing fluid is then directed through one or more oil nozzles 24A, 24B before collecting towards the outlet 27 and flowing back to the external supply 31 via conduit 32, either aided by second pump 34 (as shown in FIG. 3) or by gravity drain. Flow measuring device 35, illustratively disposed between first pump 33 and inlet 26, measures the flow rate of the flowing testing fluid. One or more plugs may be used to seal off the one or more oil nozzles 24A, 24B to be tested from the rest of the lubrication system 20, thereby creating this closed-loop system, as will be discussed in further detail below.

Figure 4:
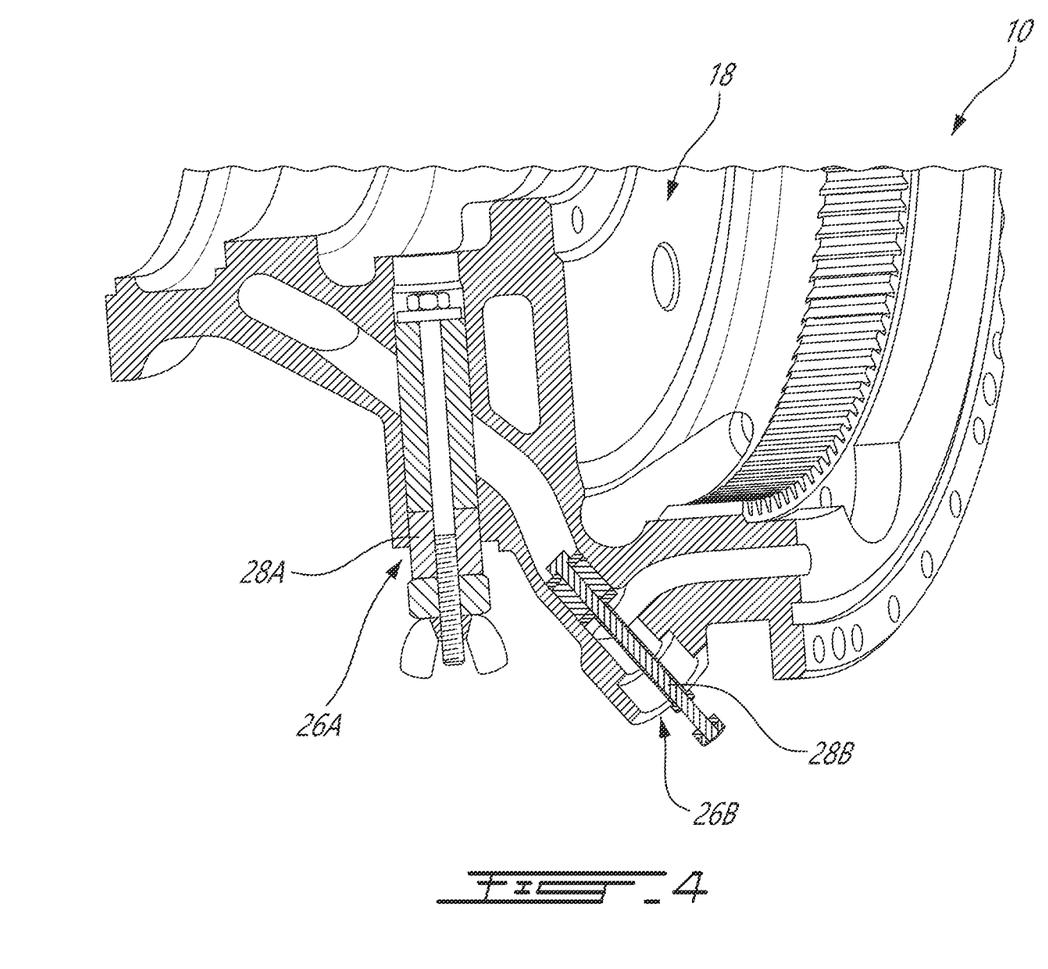
FIG. 4 is an enhanced, partial cross sectional view of the gas turbine engine of FIG. 1.

Referring to FIG. 4, an enhanced view of the power section of engine 10 is shown, with two exemplary options for inlets 26 to the lubrication system 20. These inlets 26 may be, for instance, existing engine ports of engine 10.

Each inlet 26A, 26B may be fluidly connected to the flow measuring system 30 and may be selected based on the particular oil nozzle(s) 24 to be tested, with plugs 28A, 28B provided to seal the other inlet 26A, 26B. In addition, plugs 28 may be operable to fluidly isolate the one or more oil nozzles 24 to be tested from the rest of the lubrication system 20 so that a closed-loop testing circuit may be created between the flow measuring system and the engine 10, as discussed above. Such plugs may be inserted into various existing ports of the engine 10 based on the location(s) of the oil nozzle(s) 24 to be tested.

Figure 5A:
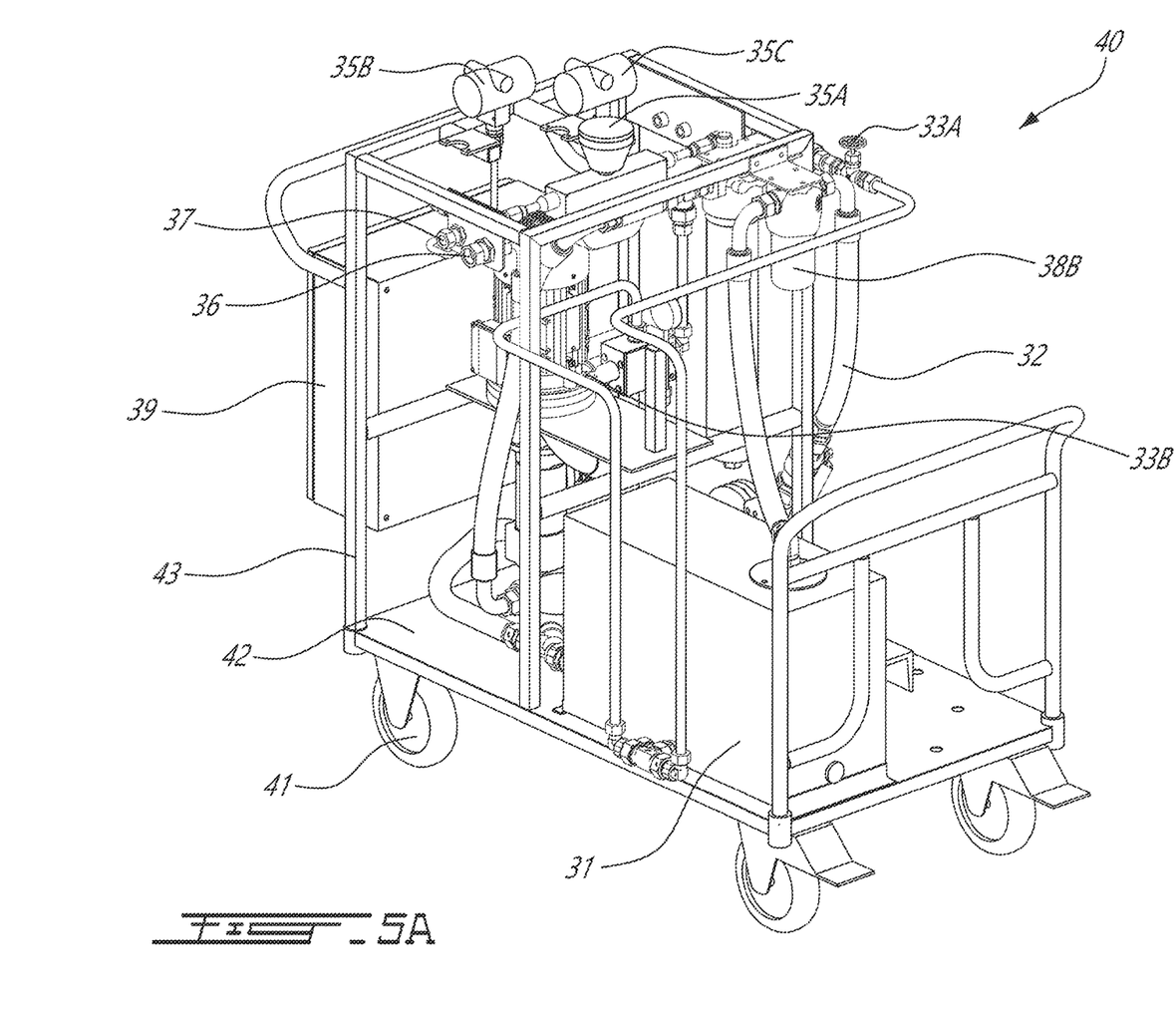
FIGS. 5A-5B are front and rear perspective views, respectively, of a portable cart for a flow measuring system.
Figure 5B:
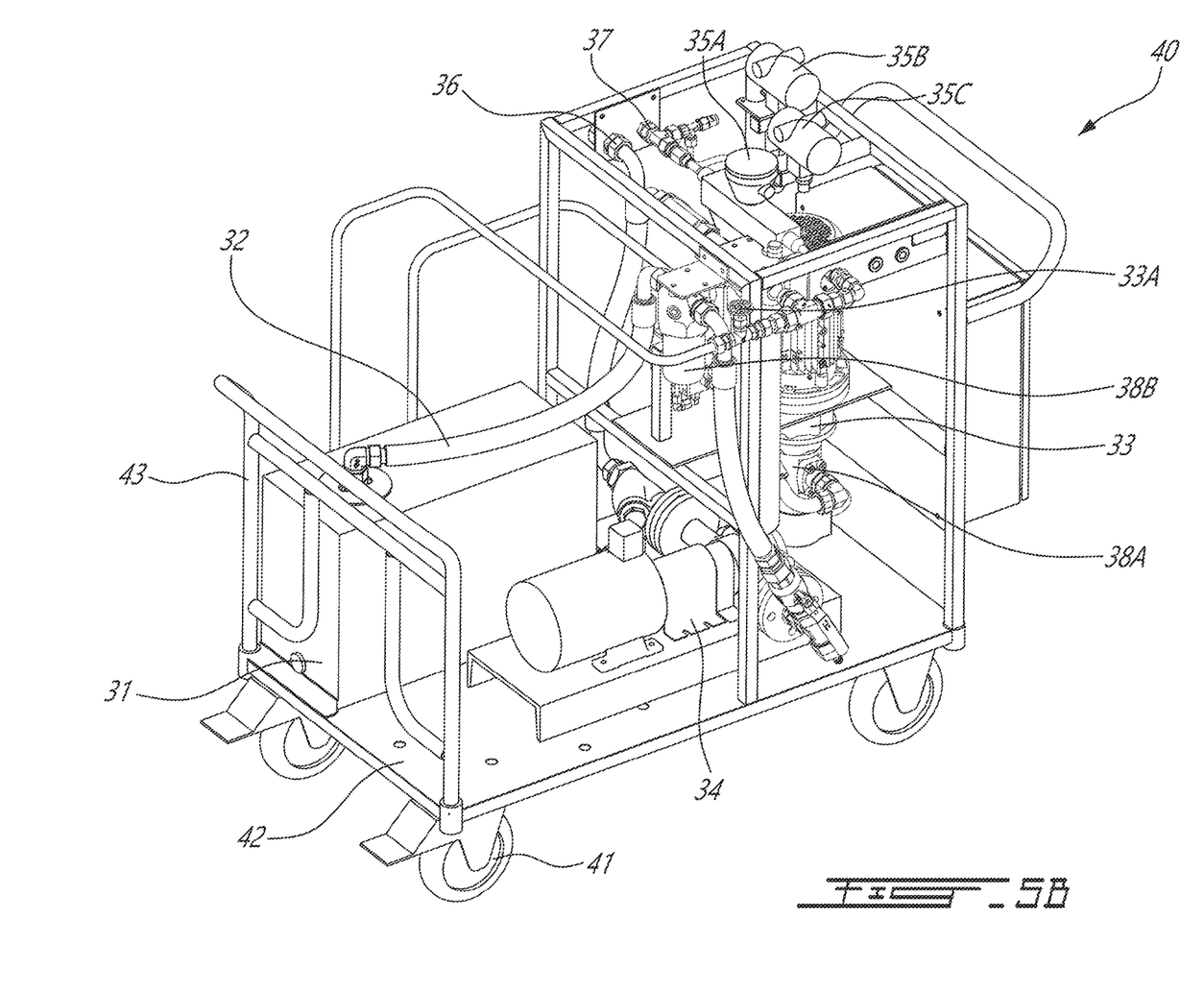

Referring to FIGS. 5A-5B, in an exemplary embodiment the flow measuring system 30 may be provided in the form of a transportable cart 40 with wheels 41, illustratively four caster wheels, a base 42, and various support structures 43 (illustratively various upright supports, horizontal supports, and a handle). Flow measuring system 30 may thus be easily transportable to where the engine 10 is located, for instance at the wing of an aircraft, to perform on-wing testing and blockage/obstruction detection. In other embodiments, the flow measuring system 30 may be provided as a fixed or permanent installation.

As discussed above, flow measuring system 30 may include a external supply 31 of a testing liquid, illustratively an oil tank disposed on the base 42 of the transportable cart 40, various conduits 32, a first pump 33 and a second pump 34. The volume of the oil tank may vary, for instance based on the size of the engine 10 and the quantity of testing liquid needed for a test. The conduits 32 may include flexible hoses and appropriate fittings. Additional conduits (not shown) are fluidly connectable to an system inlet 36, also referred to as a return, and a system outlet 37 of the flow measuring system for fluid connection to the engine 10. Flow measuring device 35 illustratively includes a flowmeter 35A, for instance a Coriolis flowmeter, a pressure transducer 35B, and a flow indicator 35C. Other components may be contemplated. First pump 33 may be a pressure pump provided with a first filter 38A (pressure filter), while second pump 34 may be a scavenge pump provided with a second filter 38B (scavenge filter). First pump 33 may be provided with a pressure regulating valve 33A and a pump overflow valve 33B. An electric cabinet 39 may be provided to control the various operations of the flow measuring system 30, and may include means to record and store flow measurement data. Other control means may be contemplated. As discussed above, the first pump 33 is operable to direct the testing fluid to the lubrication system 20 of engine 10 at inlet 26 upstream of the nozzle(s) 24, while the second pump 34 is operable to draw the testing fluid from the lubrication system 20 via outlet 27 downstream of the nozzle(s) 24, thereby allowing the testing fluid to circulate through the nozzle(s) 24 and detect any obstructions by measuring the flow of the testing fluid. Flow measuring system 30 may be provided with an on-board power supply such as a battery (not shown), or alternatively may be powered by an external power source.

Referring again to FIG. 3, a calibration circuit 50 may be provided for calibrating the flow measuring system 30. Calibration circuit 50 illustratively includes an inlet 56, conduits or tubing 22, one or more calibration nozzles 54A, 54B (illustratively two calibration nozzles 54A, 54B), additional pathways 52A, and an outlet 57. The calibration nozzle(s) 54A, 54B are provided in an unblocked or ideal state. As such, the flow measuring system 30 may be fluidly connected to the calibration circuit 50 in the same manner as described above with reference to the engine 10. The testing fluid may be circulated through the calibration circuit 50 to measure the flow resistance through the calibration nozzle(s)

54A, 54B to establish baseline value(s) for the nozzle(s) 54A, 54B which may be indicative of expected measurements for corresponding nozzle(s) 24 of engine 10 in a completely unblocked state. The same tests may then be performed at nozzle(s) 24 in the engine 10 to obtain actual values for the nozzle(s) 24. A comparison between baseline and actual values may then be performed to determine the condition of the nozzle(s) 24, as will be discussed in further detail below.

The calibration nozzle(s) 54A, 54B may correspond to the nozzle(s) 24 to be tested in the engine 10. By correspond, the calibration nozzle(s) 54A, 54B may, for instance, have the same number, size, shape, etc. as the nozzle(s) 24 to be tested. Various nozzles 54A, 54B may be provided in calibration circuit 50 so that calibration circuit 50 may be used with different engines having a variety of nozzles 24, with different selection means contemplated for circulating the testing liquid in the corresponding nozzle(s) 54A, 54B. The flow measuring system 30 may additionally include temperature and pressure sensors (not shown), as well as a fluid heater so that the conditions of the testing fluid (i.e., temperature and pressure) may be set to match those in the engine 10 for added calibration precision.

While the calibration circuit 50 in FIG. 3 is illustratively shown to be distinct from the flow measuring system 30, in various embodiments the flow measuring system 30 may include the calibration circuit 50. For instance, the cart 40 may include the calibration circuit 50 so that the calibration process may be performed at any location, for instance adjacent the aircraft before the nozzle(s) 24 in the engine are tested. Alternatively, the calibration circuit 50 may be a separate installation from the flow measuring system 30 and may be either stationary or portable (e.g., provided on an additional cart). Other configurations for the calibration circuit 50 may be contemplated.

According to the present disclosure, there is taught a method for detecting obstructions in one or more oil nozzles 24 of an aircraft engine 10. A baseline flow measurement for the oil nozzle(s) 24 is determined by flowing a testing liquid, for instance oil, through one or more unblocked nozzles 54A, 54B corresponding to the oil nozzle(s) 24, and the flow resistance through the unblocked nozzle(s) 54A, 5B is measured. Then, the testing liquid is flowed through the oil nozzle(s) 24. The flow resistance of the testing liquid through the oil nozzle(s) 24 is measured and compared with the flow resistance of the testing liquid through the unblocked nozzle(s) 54A, 54B.

Various means for measuring the flow resistance through the nozzle(s) 24 may be contemplated. In a first exemplary embodiment, the testing liquid may be provided by the flow measuring system to the nozzle(s) 24 at a fixed delivery pressure, with the flow measuring device 35 measuring any fluctuations (i.e., decreases) in the flow rate of the testing liquid which may be indicative of one or more blockages or obstructions in the nozzle(s) 24. In another exemplary embodiment, a target or predetermined flow rate of the testing liquid may be set, and the pressure of the first pump 33 required to maintain this target flow rate may be indicative of one or more blockages or obstructions in the nozzle(s) 24. Various combinations of these testing methods, as well as other testing methods, may be contemplated. Preferably, the same or similar conditions (e.g., fluid viscosity and temperature) should be found during the baseline tests using the calibration circuit 50 and during the on-engine tests. Control of the flow rate and pressure of the testing liquid exiting the flow measuring system 30 may be controlled by, for instance, controls provided in the electric cabinet 39 and/or via the pressure regulating valve 33A.

During the obstruction test, if the actual flow resistance offered by the nozzle(s) 24 is greater than the baseline flow resistance measured at the calibration nozzle(s) 54A, 54B, this can be indicative of the nozzle(s) 24 being at least partially obstructed. The magnitude of the difference between the actual flow resistance at nozzle(s) 24 and the baseline flow resistance at calibration nozzle(s) 54A, 54B can be used to quantify the obstruction and aid in determining whether or not maintenance is required. For instance, one or more predetermined thresholds may be set for this difference, and one this threshold(s) has been met, a determination may be made that the nozzle(s) 24 is/are obstructed. Additional thresholds may be indicative of a need to provide maintenance to the nozzle(s) 24. For instance, a first (lower) threshold being met may be indicative of a blockage in one or more nozzles 24 that merit monitoring, while a second (higher) threshold being met may be indicative of a blockage in one or more nozzles 24 that requires immediate attention. Other thresholds may be contemplated.

In other embodiments, the flow measuring system 30 may be provided as an automated or semi-automated testing system rather than a portable cart 40, where suitable valves are used to isolate the nozzle(s) 24 from the lubrication system 20 and fluidly connect the nozzle(s) 24 to a controlled (test) testing fluid source for the purpose of testing the oil nozzles for obstruction (i.e., increased flow resistance).

Figure 6A:
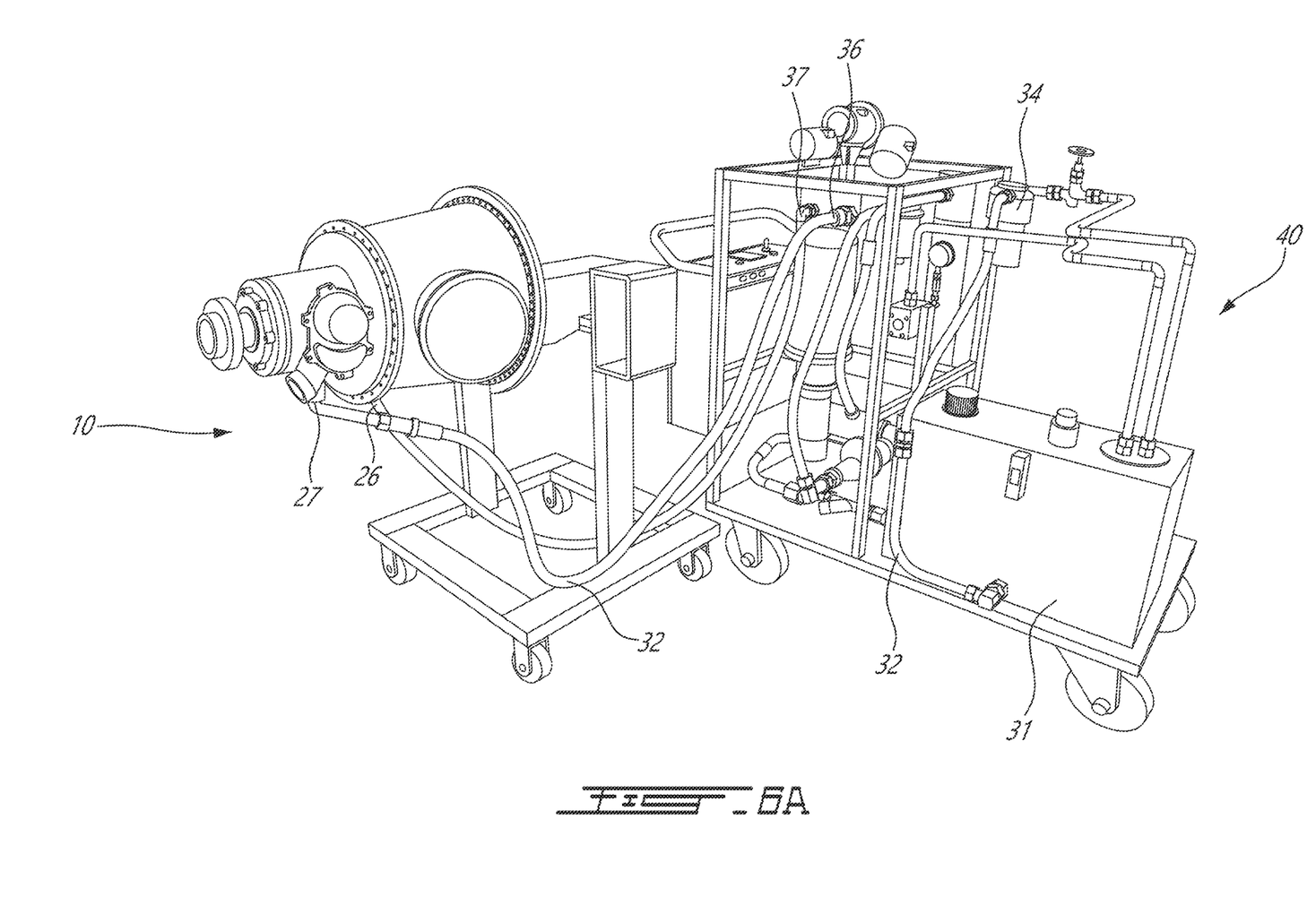
FIGS. 6A-6B are perspective views of exemplary flow measuring systems fluidly coupled to a gas turbine engine.
Figure 6B:
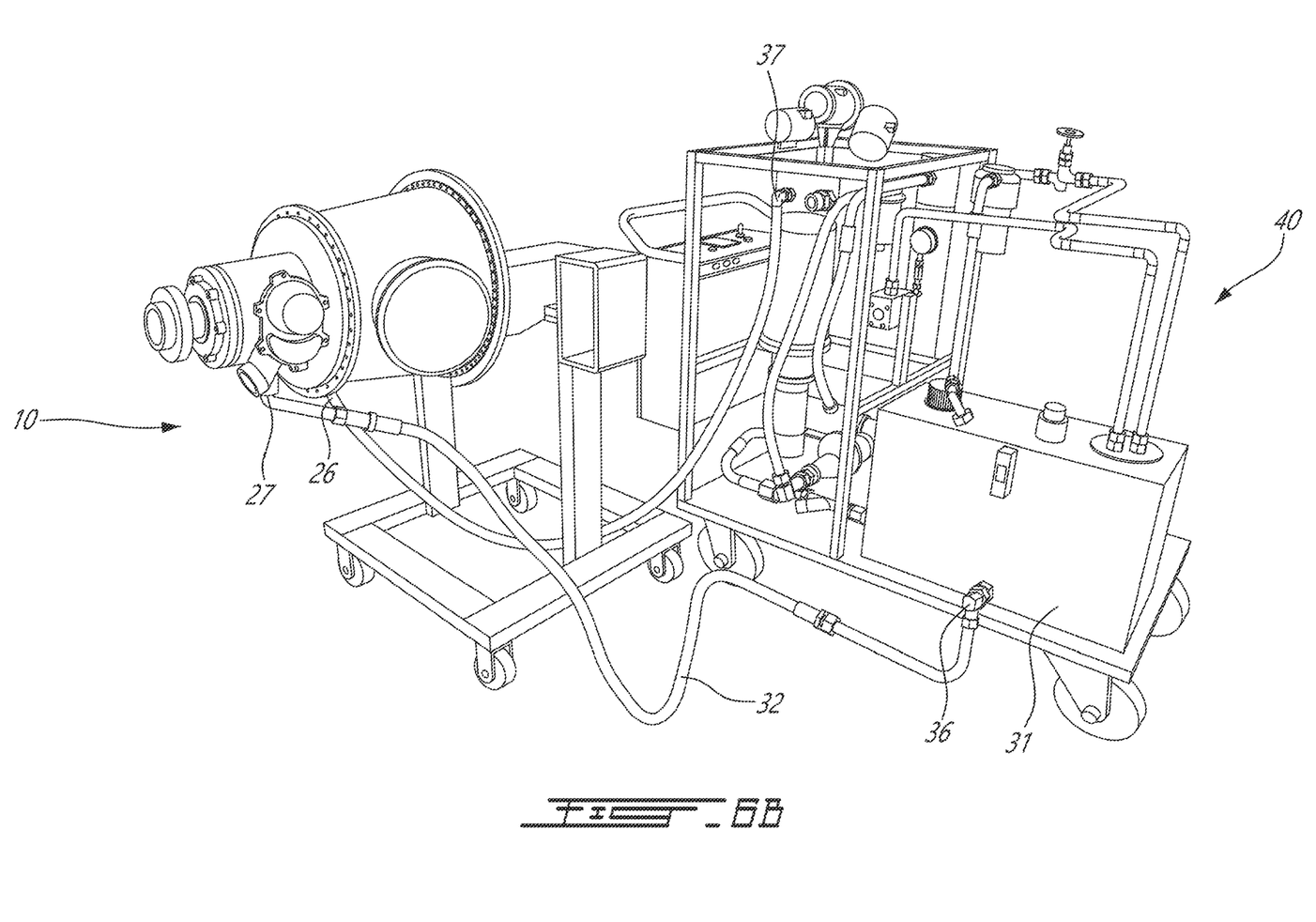

Referring to FIGS. 6A-6B, two exemplary flow measuring systems 30 are shown fluidly coupled to a hot section of a gas turbine engine 10 (i.e., the combustor 16 turbine section 18). For simplicity, the rest of the engine 10 is omitted. FIG. 6A depicts a flow measuring system 30 which includes a scavenge pump 34 operable to draw the testing fluid away from the engine 10 via outlet 27. Scavenge pump 34 then directs the testing fluid into the external supply 31 via conduit 32. The scavenge pump 34, along with the various plugs 28, may minimize the risk of contamination of testing liquid to the other portions of the engine 10. In the embodiment shown in FIG. 6B, scavenge pump 34 is omitted, and flow measuring system 30 relies on a gravity drain from outlet 27 to draw the testing fluid away from the engine 10. Other configurations may be contemplated.

It can be appreciated from the foregoing that at least some embodiments disclose systems and methods for measuring a flow of a testing liquid through one or more oil nozzles in an aircraft engine, thereby allowing any obstructions or partial/full blockages in these nozzles to be detected without requiring disassembly of the engine for visual inspection.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A flow measuring system for one or more oil nozzles of a lubrication system of an aircraft engine, comprising:
an external supply of a testing liquid;
a pump fluidly connecting the external supply of the testing liquid to an inlet of the lubrication system via a first conduit, the inlet to the lubrication system disposed upstream of the one or more oil nozzles;
a second conduit fluidly connecting an outlet of the lubrication system to the external supply of the testing liquid, the outlet of the lubrication system disposed downstream of the one or more oil nozzles;
a flow measuring device operable to measure a flow resistance through the one or more oil nozzles; and
a calibration circuit fluidly having one or more calibration nozzles correspond to the one or more oil nozzles of the lubrication system, wherein the flow measuring device is further operable to measure a baseline flow resistance through the one or more calibration nozzles.

2. The flow measuring system as defined in claim 1, further comprising an additional pump fluidly coupled to the outlet of the lubrication system and operable to draw the testing liquid from the lubrication system.

3. The flow measuring system as defined in claim 1, wherein the pump is operable to deliver the testing liquid to the one or more oil nozzles at a fixed delivery pressure, and the flow measuring device is operable to measure a reduction in a flow rate of the testing liquid through the one or more oil nozzles at the fixed delivery pressure.

4. The flow measuring system as defined in claim 1, wherein the pump is operable to modulate a delivery pressure of the testing liquid to the one or more oil nozzles to maintain a predetermined flow rate, and the flow measuring device is operable to measure the delivery pressure required to maintain the predetermined flow rate.

5. The flow measuring system as defined in claim 1, further comprising one or more plugs insertable into one or more ports of the aircraft engine to create a closed circuit between the external supply of testing liquid and the one or more oil nozzles.

6. The flow measuring system as defined in claim 1, wherein the external supply of the testing liquid contains oil.

7. A system for detecting obstructions in one or more oil nozzles of a lubrication system of an aircraft engine, comprising:
a flow measuring unit having an external supply of a testing liquid, a pump fluidly coupled to an outlet of the flow measuring unit, a flow measuring device operable to measure a flow resistance through the one or more oil nozzles, and an inlet of the flow measuring unit; and
a calibration circuit having one or more calibration nozzles corresponding to the one or more oil nozzles of the lubrication system, an inlet of the calibration circuit fluidly connectable to the outlet of the flow measuring device and disposed upstream of the one or more calibration nozzles, and an outlet of the calibration circuit fluidly connectable to the inlet of the flow measuring device and disposed downstream of the one or more calibration nozzles;
wherein the flow measuring unit is operable to circulate the testing liquid through the calibration circuit to measure a baseline flow measurement for the one or more calibration nozzles and to circulate the testing liquid through the one or more oil nozzles of the lubrication system to compare a flow measurement through the one or more oil nozzles to the baseline flow measurement.

8. The system as defined in claim 7, wherein the flow measuring unit further includes an additional pump fluidly coupled to the inlet of the flow measuring unit.

9. The system as defined in claim 7, wherein the pump is operable to deliver the testing liquid to the one or more oil nozzles at a fixed delivery pressure, and the flow measuring device is operable to measure a reduction in a flow rate of the testing liquid through the one or more oil nozzles at the fixed delivery pressure.

10. The system as defined in claim 7, wherein the pump is operable to modulate a delivery pressure of the testing liquid to the one or more oil nozzles to maintain a predetermined flow rate, and the flow measuring device is operable to measure the delivery pressure required to maintain the predetermined flow rate.

11. The system as defined in claim 7, wherein the flow measuring unit is portable.

12. The system as defined in claim 7, further comprising one or more plugs insertable into one or more ports of the aircraft engine to create a closed circuit between the external supply of the testing liquid and the one or more oil nozzles.

13. The system as defined in claim 7, wherein the external supply of the testing liquid contains oil.

14. A method for detecting obstructions in an oil nozzle of an aircraft engine, comprising:
determining a baseline flow measurement for the oil nozzle by flowing a testing liquid through an unblocked nozzle corresponding to the oil nozzle and measuring a flow resistance through the unblocked nozzle;
flowing the testing liquid through the oil nozzle;
measuring a flow resistance of the testing liquid through the oil nozzle; and
comparing the flow resistance of the testing liquid through the oil nozzle with the flow resistance of the testing liquid through the unblocked nozzle.

15. The method as defined in claim 14, wherein the flowing the testing liquid through the oil nozzle includes flowing the testing liquid through the oil nozzle at a fixed delivery pressure, and wherein the measuring the flow resistance of the testing liquid through the oil nozzle includes measuring a reduction in a flow rate of the testing liquid through the oil nozzle at the fixed delivery pressure.

16. The method as defined in claim 14, wherein the flowing the testing liquid through the oil nozzle includes modulating a delivery pressure of the testing liquid through the oil nozzle to maintain a predetermined flow rate, and wherein the measuring the flow resistance of the testing liquid through the oil nozzle includes measuring the delivery pressure required to maintain the predetermined flow rate.

17. The method as defined in claim 14, wherein the comparing the flow resistance of the testing liquid through the oil nozzle with the flow resistance of the testing liquid through the unblocked nozzle further includes calculating a difference between the flow resistance of the testing liquid through the oil nozzle with the flow resistance of the testing liquid through the unblocked nozzle and comparing the difference to a predetermined threshold indicative of an obstruction in the oil nozzle.

18. The method as defined in claim 14, further comprising providing a portable flow measuring unit including an external supply of the testing liquid, and transporting the portable flow measuring unit to the aircraft engine subsequently to flowing the testing liquid through the oil nozzle.

19. The method as defined in claim 14, wherein the flowing the testing liquid through the oil nozzle includes flowing oil from an external supply of oil through the oil nozzle.

* * * * *